Sept. 27, 1966     P. A. LIVERA ET AL     3,275,190
LEAD-WIRE FEEDING APPARATUS
Filed April 8, 1965     3 Sheets-Sheet 1
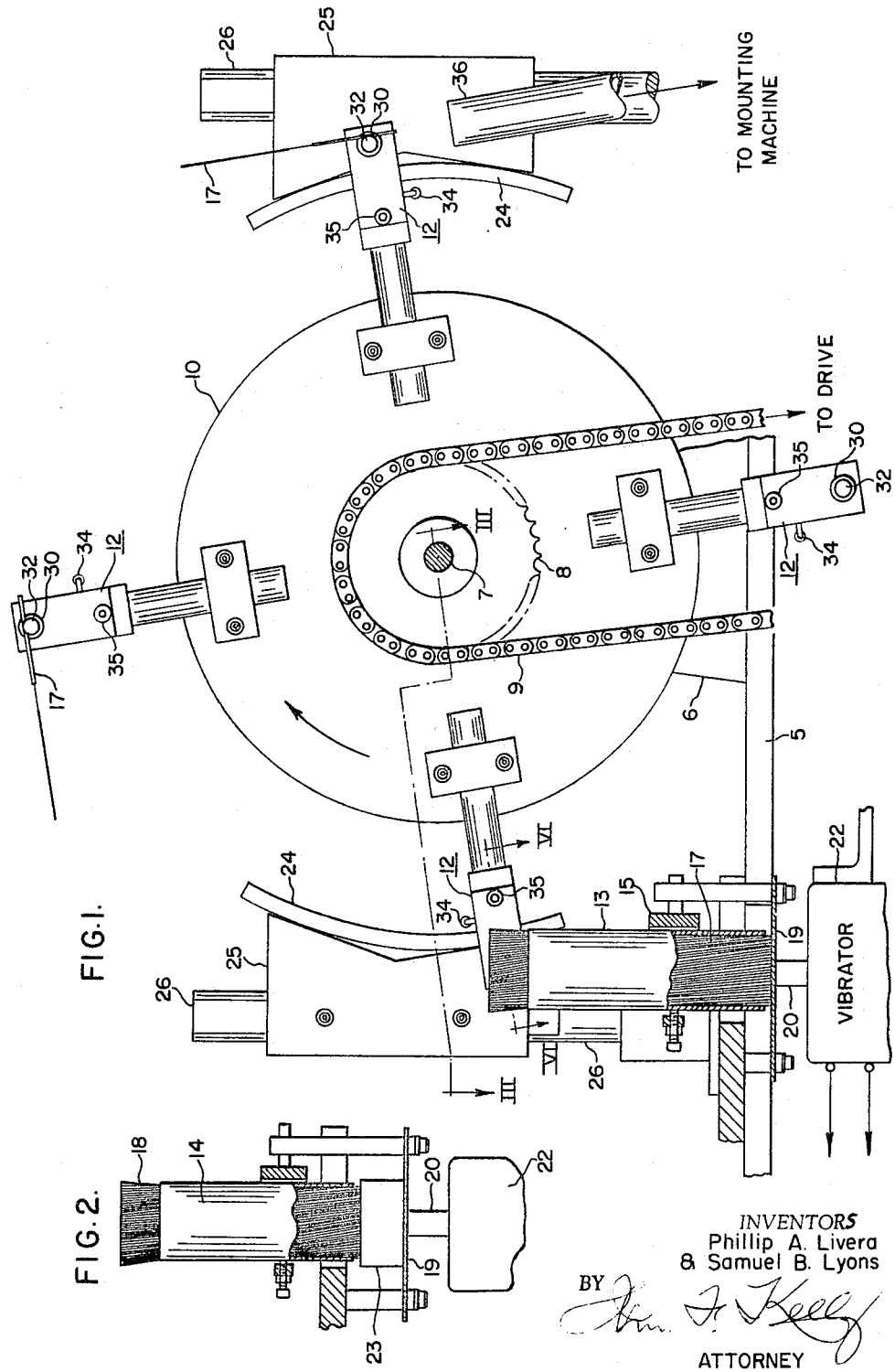
INVENTORS
Phillip A. Livera
& Samuel B. Lyons
BY
ATTORNEY

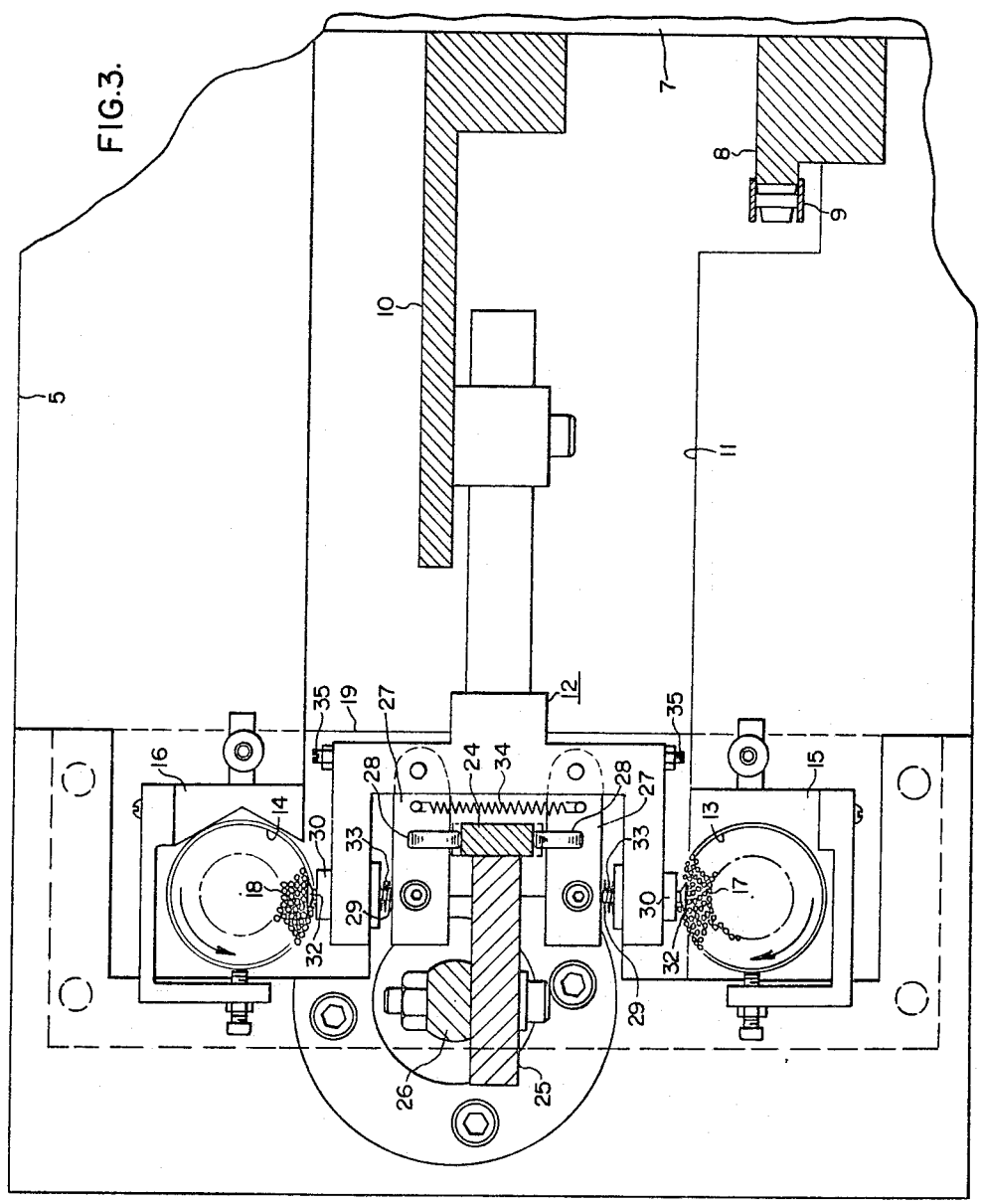

Sept. 27, 1966   P. A. LIVERA ETAL   3,275,190
LEAD-WIRE FEEDING APPARATUS
Filed April 8, 1965   3 Sheets-Sheet 3

*INVENTORS*
Phillip A. Livera
& Samuel B. Lyons
BY
ATTORNEY

United States Patent Office 3,275,190
Patented Sept. 27, 1966

3,275,190
LEAD-WIRE FEEDING APPARATUS
Phillip A. Livera, Bloomfield, and Samuel B. Lyons, West Orange, N.J., assignors to Westinghouse Electric Corporation, Pittsburgh, Pa., a corporation of Pennsylvania
Filed Apr. 8, 1965, Ser. No. 446,548
8 Claims. (Cl. 221—93)

The present invention relates to an apparatus for the individual feeding of lead-wires for electric lamps to the mount machine or other apparatus employed in the production of electric lamps.

Apparatus of this general nature is known to the art but heretofore has not been too successful because the lead-wires were too susceptible to crossing, bending and eventually jamming thus necessitating elimination of the jammed agglomeration. The fact that such lead-in wires are of at least two wire sections having different diameters at each end of the wire has contributed to the difficulty in picking up a single lead-in wire and increased the likelihood of bending which is conducive of jamming during subsequent handling of such lead-in wires. Also such prior type apparatus has been operable at too low a rate of speed thus resulting in increased manufacturing costs.

It is accordingly the primary object of the present invention to provide a lead-wire feeding apparatus which is efficient in its operation of picking up individual lead-wires from a bundle and transferring each selected lead-wire to other apparatus at a relatively high rate of speed during the manufacture of electric lamps.

Another object of the present invention is the provision of a lead-wire feeding apparatus wherein individual lead-wires are picked up from a bundle and transferred to other apparatus without the possibility of inadvertent bending and jamming thereof.

The foregoing objects of the present invention, together with other objects which will become apparent to those skilled in the art from the following description, are achieved by providing a suitable container in which the lead-wires are somewhat loosely stacked. This causes such lead-wires to lean in one direction from the vertical and such stacked lead-wires are preferably subjected to vibration to thus impart circular motion thereto, with greatest movement occurring at the outer periphery of the bundle adjacent the wall of the container and the direction of movement depending upon their direction of slant. The rate of speed at which such wires pass a given point adjacent the container wall is controlled by both the vibration frequency and amplitude which can accordingly be set to achieve a very high rate of several thousand per hour. During such vibratory motion of the lead-wires about the periphery of the container, a pick-up finger moves into engagement with the outermost layer. Such finger then grasps an individual lead-wire and withdraws the latter from the bundle in the cylindrical container and transfers such lead-wire to a desired position where it deposits the lead-wire for further processing in the manufacture of an electric lamp.

The present invention can be readily understood by reference to the accompanying drawings wherein:

FIGURE 1 is an elevational view of the lead-wire feeding apparatus of the present invention;

FIG. 2 is a fragmentary elevational view of the cylindrical container for the bundle of lead-wires of shorter length;

FIG. 3 is a sectional view on an enlarged scale and taken on the line III–III of FIG. 1 and looking in the direction indicated by the arrows;

Figure 4:
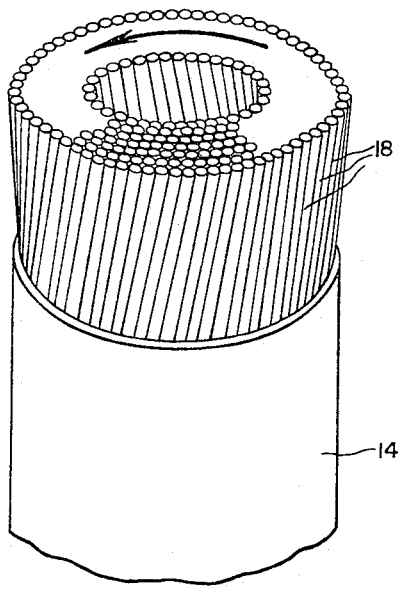
FIG. 4 is a fragmentary perspective view on an enlarged scale of the cylindrical container with its partially filled bundle of lead-wires leaning in one direction so that rotation thereof under operation of the vibrator is in a counterclockwise direction as shown by the arrow in this figure.

FIGS. 7 to 10 inclusive are fragmentary plan views showing various positions of the lead-wire pick-up finger during its operation of selecting one of the lead-wires from the bundle and withdrawing it longitudinally from the cylindrical container;

FIGS. 11 and 12 are elevational views of the customary three-section long and short lead-wire with their respective ends of different diameter.

Referring now more specifically to the drawings, the lead-wire feeding apparatus as shown in FIG. 1 comprises a platform or base 5 having a bracket or the like 6 extending upwardly therefrom and in which a shaft 7 is journalled for rotation. A sprocket gear 8 which comprises a part of a drive means is keyed or otherwise affixed to this shaft 7 and a sprocket chain 9 extending from a suitable prime mover, such as an electric motor or the like (not shown), rotates the sprocket gear 8 and hence the shaft 7 to which it is affixed. Also keyed or otherwise affixed to this shaft 7 so as to rotate therewith is a transfer member in the form of a disc 10 provided with a plurality of angularly disposed bifurcated arms 12 which project outwardly from the periphery of such disc 10 and swing through a slot 11 in the base 5 (FIG. 3).

A pair of containers 13 and 14 of any suitable shape but preferably cylindrical and open at each end are held by C-clamps 15 and 16 on one side of the path of movement of each of the parallel portions of the bifurcated arms 12, as seen more clearly in FIG. 3. The cylindrical container 13, as shown in FIG. 1, is partially filled to about three-quarters capacity with a bundle of the longer three-sectioned lead-wires 17 (FIG. 12) and the container 14, as shown in FIG. 2, is similarly partially filled with a bundle of the shorter three-sectioned lead-wires 18 (FIG. 11). The lower end of the bundle of longer lead-wires 17 rests upon a plate 19 to which the armature 20 of an electric vibrator 22 is connected. In a somewhat similar manner, the bundle of shorter lead-wires 18 are responsively connected to the vibratory plate 19 through the interposition of a block 23, as shown in FIG. 2. This compensates for the differences in length between the lead-wires 17 and 18 thus disposing the tops of all the long and short lead-wires 17 and 18 in the same horizontal plane.

Figure 5:
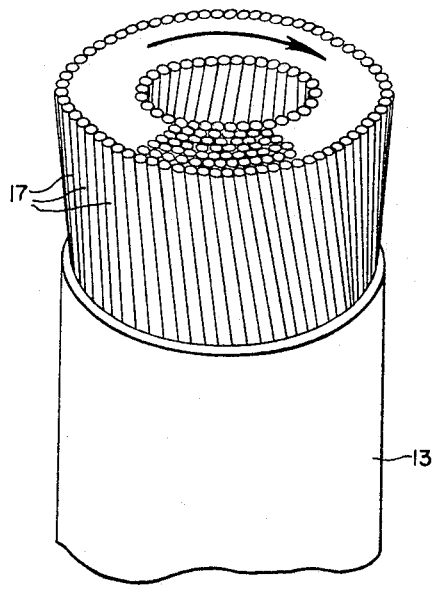
FIG. 5 is a view identical to FIG. 4, except that the slant of the lead-wires is in an opposite direction so that the lead-wires will rotate under operation of the vibrator in the opposite or clockwise direction as shown by the arrow in this FIG. 5.

By reference more particularly to FIGS. 4 and 5, it will be noted that the containers 13 and 14 are filled with the respective elongated lead-wires 17 and 18 to about three-quarters capacity with the upper portions of the lead-wires projecting out of the containers. This, accordingly, leaves an opening in the center and with such lead-wires leaning or slanting either to the right or left while their lower ends rest on the plate 19 and block 23. When such lead-wires slant to the right and are subjected to vibration they will move through a counterclockwise circular path as shown by the arrow in FIG. 4.

Similarly, if the individual lead-wires in the bundle slant to the left, then under vibration from the vibrator 22 acting through the plate 19, such lead-wires will move or gravitate in a clockwise circular path, as shown by the arrow in FIG. 5. In either direction of rotation, the rate at which such lead-wires pass a given point adjacent the rim or periphery of the container 13 and 14 is controlled by both the vibration frequency and amplitude. This is always made sufficient so as to assure a circular row of lead-wires immediately against the wall of the container and thus leaving the center opening in the containers, as shown in FIGS. 4 and 5.

Figure 6:
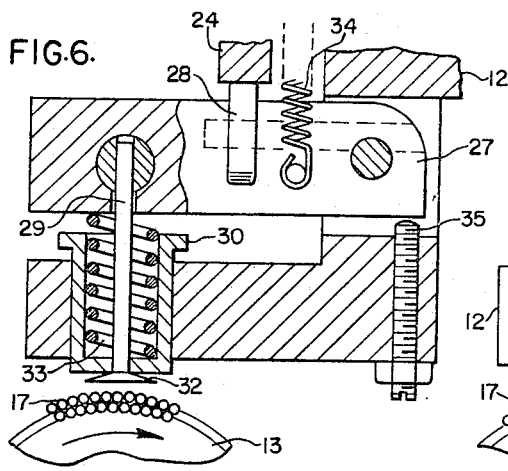
FIG. 6 is a sectional view taken on the line VI–VI of FIG. 1 and looking in the direction of the arrows.

During rotation of the transfer disc 10, the outer parallel ends of the bifurcated arms 12 pass each side of arcuate shaped cams 24 which may be diametrically disposed relative to each other, as seen in FIG. 1. Such cams 24 are carried by blocks or the like 25 which are bolted or otherwise secured to pedestal supports 26 extending upwardly from the base 5. Referring now more particularly to FIGS. 3 and 6, it will be noted that the outer parallel ends of the bifurcated arms 12 are provided with a pair of longitudinally extending pivoted bars 27 provided with rollers 28 which ride over the outer edges of the cam 24 as the parallel ends of the bifurcated arms 12 pass therebetween during rotation of the transfer disc 10. Since both of these pivoted bars 27 and the parts carried thereby are identical, only one such mechanism is shown on a slightly enlarged scale in FIG. 6 which will be described in detail.

Figure 7:
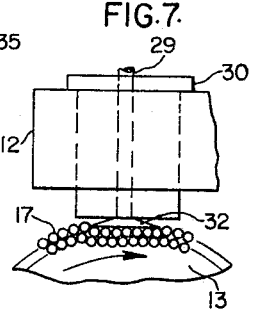

Each pivoted bar 27 is provided with a laterally projecting pivoted pick-up finger 29 which passes completely through a retainer 30 slidably fitted into an opening in each of the parallel ends of the bifurcated arm 12, with the outer end of such finger 29 having an enlarged flanged head 32. A compression spring 33 is disposed in each retainer 30 and surrounds the pick-up finger 29 for the purpose of normally biasing the latter in its innermost position with its flanged head 32 against the bottom of the retainer 30 (FIGS. 6 and 7). At the same time a coil spring 34 interconnects the pivoted bars 27 thus urging their pivoted ends against stop-pins 35 so that the rollers 28 carried by the bars 27 are in position to ride on the outer edges of the cams 24, as previously mentioned, and the retainer 30 is maintained in its normally fixed position with its shoulder spaced from the end of the bifurcated arm 12, as shown in FIG. 6.

Figure 8:
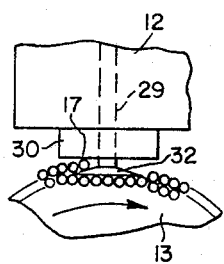
Figure 9:
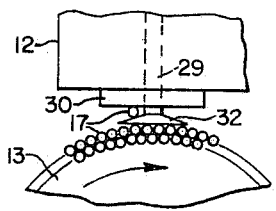

When the bifurcated arms 12 are rotated by the disc 10 in a clockwise direction, as shown by the arrow in FIG. 1, the parallel ends thereof pass each side of the cam 24 with the result that the rollers 28 ride on the cam-surfaced edges thereof thus rotating the bars 27 about their respective pivots. This first pushes the retainer 30 with its pick-up finger 29 toward the bundle of lead-wires 17 protruding above their container 13 (FIG. 5) until the shoulder of the retainer 30 contacts the end of the bifurcated arm 12. At this time, the flanged end 32 of the pick-up finger 29 will have pushed against the outer circular row of the rotating bundle of lead-wires 17 compressing them slightly, as shown in FIG. 7. The action of cam 24 on roller 28 next forces the pick-up finger 29 slightly outward from the retainer 30, with slight compression of spring 33 and further expansion of spring 34, which thus opens the bundle sufficiently so that some of the rotating lead-wires 17 in the outer row within the container 13 pass behind the flanged end 32 of the pick-up finger 29, as seen in FIG. 8.

Figure 10:
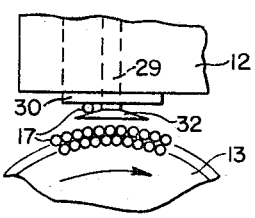

The bifurcated arm 12 continues its upward movement with the cam 24 causing the roller 28 to operate the assembly so that both the retainer 30 and pick-up finger 29 begin to recede again into the end of the bifurcated arm 12. However, due to the taper of the underside of such flanged head 32, during its upward sweep and while receding, all save one of such lead-wires 17 will drop out from beneath such head leaving only one such lead-wire 17 in the manner shown in FIG. 9. Upon the complete receding of the retainer 30 into the end of the bifurcated arm 12 and the pick-up finger 29 within such retainer under urging by the expansion of coil spring 33, the single lead-wire 17 nearest the axis of the pick-up finger 29 is then firmly grasped between the outer surface of the retainer 30 and the underside of the flanged head 32 of the pick-up finger 29 by the potential energy of the coil spring 33, as shown in FIG. 10. Thereupon, the continued rotation of the disc 10 will cause the rollers 28 to ride off the cam 24 and the bifurcated arm 12, with its pick-up fingers 29 grasping both a long lead-wire 17 removed from the container 13 and a short lead-wire 18 removed from the container 14, continues to rotate with such disc 10 until such bifurcated arm 12 arrives at the cam 24 positioned approximately diametrically opposite to the first mentioned cam 24 at the pick-up station of the apparatus. At this latter location the rollers 28 again ride on the cam 24 causing the pick-up fingers 29 to move outwardly from the retainers 30 thereby releasing the grasped lead-wires 17 and 18 to a conveyor or receiving member, such as separate funnels or the like 36, down which they gravitate to the customary mounting machine for use in the production of a complete electric lamp.

It should thus be apparent from the foregoing disclosure, that a lead-wire feeding apparatus has been provided by the present invention in which individual lead-wires are picked-up from a bundle of such wires with exactitude without any tendency for such wires to tangle or bend, particularly since they are in mid-air during approximately ninety percent of the time during their transfer. Moreover, the pick-up finger which is so designed as to pick up one lead-wire at a time is projected into the circular flow of such wires substantially at the outer edge only of the moving bundle so that all remaining wires continue in their paths with only slight deviation under the influence of the vibrator with its frequency and amplitude controlling the rapidity of movement of such lead-wires.

If desired, the containers for the lead-wires may be any suitable shape other than rectangular and provided with a bottom, and such containers themselves rotated at a suitable speed in lieu of vibratory motion of such wires. The centrifugal force exerted by such rotating container would thus also cause suitable slanting and condition the lead-wires for individual picking up and withdrawing from the container in the same manner as above described. The fact that these loosely stacked lead-wires slant in one direction makes the present pick-up apparatus particularly adaptable to beaded lead-wires as used primarily in radio tube production and the like.

Also, since such circular motion and the quantity of lead-wires in their container provides a central opening such area can be utilized to feed additional lead-wires into the container at controlled intervals as they are removed therefrom by the transfer mechanism. Although the rotating transfer disc, with its bifurcated arms, is operable at relatively high production speeds on the order of several thousand lead-wires per hour, such rate can be further increased by utilization of an endless chain having many more closely spaced pick-up fingers.

It is to be understood that although one specific embodiment of the present invention has been herein shown and described, still further embodiments thereof may be made without departing from the spirit and scope of the invention.

We claim as our invention:
1. An apparatus for withdrawing lead-wires from a bundle and feeding them individually to a conveyor for subsequent use, said apparatus comprising:
  (a) a container for holding a bundle of stacked lead-wires slanting in one direction slightly from the vertical;
  (b) means operatively associated with said bundle of stacked lead-wires in said container to cause said lead-wires to traverse a generally circular path in their direction of slant;
  (c) a transfer member provided with an arm having a pick-up finger operable to grasp an individual lead-wire in said container; and
  (d) drive means for operating said transfer member to cause said arm to move said pick-up finger into said bundle with attendant grasping of an individual lead-wire and the withdrawing thereof from said container, and said transfer means upon continued operation thereof moving said arm and pick-up finger to cause the latter to deposit its grasped individual lead-wire on a conveyor for further transmission thereof.

2. An apparatus for withdrawing lead-wires from a bundle and feeding them individually to a conveyor for subsequent use in the production of an electric lamp, said apparatus comprising:
 (a) an open-ended generally circular container for holding a loosely packed bundle of stacked lead-wires projecting above the top of said container and slanting in one direction slightly from the vertical;
 (b) vibrator means operatively associated with said bundle of stacked lead-wires in said container to vibrate said bundle and cause said lead-wires to traverse a circular path in their direction of slant;
 (c) a transfer member provided with an arm having a pick-up finger operable to project into a peripheral portion of said bundle which projects above said container and grasp an individual lead-wire in said container; and
 (d) drive means for operating said transfer member to cause said arm to move said pick-up finger into said bundle with attendant grasping of an individual lead-wire and the withdrawing thereof from said container, and said transfer means upon continued operation thereof moving said arm and pick-up finger to cause the latter to deposit its grasped individual lead-wire on a conveyor for further transmission thereof in the production of a complete electric lamp.

3. An apparatus for withdrawing lead-wires from a bundle and feeding them individually to a conveyor for subsequent use in the production of an electric lamp, said apparatus comprising:
 (a) a generally circular container for holding a bundle of stacked lead-wires slanting in one direction slightly from the vertical;
 (b) vibrator means forming a support for said bundle of stacked lead-wires in said container and operable to cause said lead-wires to traverse a circular path within said container in the direction of their slant;
 (c) a transfer member provided with an arm having a pick-up finger operable to grasp an individual lead-wire in said container; and
 (d) drive means for operating said transfer member to cause said arm to move said pick-up finger into said bundle with attendant grasping of an individual lead-wire and the withdrawing thereof from said container, and said transfer means upon continued operation thereof moving said arm and pick-up finger to cause the latter to deposit its grasped individual lead-wire on a conveyor for further transmission thereof in the production of a complete electric lamp.

4. An apparatus for withdrawing lead-wires from a bundle and feeding them individually to a conveyor for subsequent use in the production of an electric lamp, said apparatus comprising:
 (a) a generally circular container for holding a bundle of stacked lead-wires slanting in one direction slightly from the vertical;
 (b) vibrator means operatively associated with said bundle of stacked lead-wires in said container to cause said lead-wires to traverse a generally circular path in their direction of slant;
 (c) an endless transfer member provided with a plurality of spaced arms each having pick-up fingers operable to grasp an individual lead-wire in said container; and
 (d) drive means for operating said transfer member to cause said arm to move said pick-up finger into said bundle with attendant grasping of an individual lead-wire and the withdrawing thereof from said container, and said transfer means upon continued operation thereof moving said arm and pick-up finger to cause the latter to deposit its grasped individual lead-wire on a conveyor for further transmission thereof in the production of a complete electric lamp.

5. An apparatus for withdrawing lead-wires from a bundle and feeding them individually to a conveyor for subsequent use in the production of an electric lamp, said apparatus comprising:
 (a) an open-ended container for holding a loosely packed bundle of stacked lead-wires projecting above the top of said container and slanting in one direction slightly from the vertical;
 (b) vibrator means forming a support for said bundle of stacked lead-wires in said container and operable to cause said lead-wires to transverse a circular path within said container in their direction of slant;
 (c) an endless transfer member provided with a plurality of spaced arms each having pick-up fingers operable to grasp an individual lead-wire in said container; and
 (d) drive means for operating said transfer member to cause said arm to move said pick-up finger into said bundle with attendant grasping of an individual lead-wire and the withdrawing thereof from said container, and said transfer means upon continued operation thereof moving said arm and pickup finger to cause the latter to deposit its grasped individual lead-wire on a conveyor for further transmission thereof in the production of a complete electric lamp.

6. An apparatus for withdrawing lead-wires from a bundle and feeding them individually to a conveyor for subsequent use in the production of an electric lamp, said apparatus comprising:
 (a) a pair of cylindrical open-ended containers for holding a loosely packed bundle of stacked long and short lead-wires respectively which project above and below the open ends of their containers with the lead-wires in each said bundle slanting in one direction slightly from the vertical;
 (b) vibrator means including a plate for supporting said loosely packed bundles of stacked lead-wires in their containers and operable to cause said lead-wires to traverse a circular path interiorly of each container in their direction of slant;
 (c) a rotatable member provided with a plurality of bifurcated arms having a pick-up finger at the parallel ends thereof, and each said pick-up finger being operable to grasp an individual lead-wire in said container; and
 (d) drive means for operating said rotatable member and its bifurcated arms to cause said arms to move said pick-up fingers into each respective long and short bundle of lead-wires with attendant grasping of an individual lead-wire and the withdrawing thereof from each respective container, and said rotatable member upon continued operation thereof moving said bifurcated arms with their pickup fingers to cause each of the latter to deposit its grasped individual lead-wire on a conveyor for further transmission thereof in the production of a complete electric lamp.

7. An apparatus for withdrawing lead-wires from a bundle and feeding them individually to a conveyor for subsequent use in the production of an electric lamp, said apparatus comprising;
 (a) a pair of cylindrical open-ended containers for holding a loosely packed bundle of stacked long and short lead-wires respectively which project above and below the open ends of their containers with the lead-wires in each said bundle slanting in one direction slightly from the vertical;
 (b) vibrator means including a plate for supporting said loosely packed bundles of stacked lead-wires in their containers and operable to cause said lead-wires to traverse a circular path interiorly of each container in their direction of slant with the rate of travel of such lead-wires past a given point adjacent their containers being controlled by the frequency and amplitude of said vibrator means;

(c) a rotatable member provided with a plurality of outwardly projecting bifurcated arms movable through a predetermined path adjacent the containers with their loosely packed bundle of stacked lead-wires;

(d) pick-up fingers disposed at the parallel ends of said bifurcated arms and operable to reciprocally move into said bundle of lead-wires in said containers and grasp an individual lead-wire in said bundle; and (e) drive means for operating said rotatable member and its bifurcated arms to cause said arms to reciprocally move said pick-up fingers into each respective long and short bundle of lead-wires and after grasping an individual lead-wire withdraw it from each respective container, and said rotatable member upon continued operation thereof moving said bifurcated arms with their pick-up fingers to cause each of the latter to deposit its grasped individual lead-wire on a conveyor for further transmission thereof in the production of a complete electric lamp.

8. Apparatus for withdrawing elongated members from a bundle and feeding them individually to a receiving member, said apparatus comprising:

(a) an open-ended generally circular container adapted to hold a loosely packed bundle of said elongated members which project above the top of said container and are slanted slightly in one direction from the vertical;

(b) vibrator means operatively associated with said contained bundle of elongated members to vibrate said bundle of said elongated members and cause them to traverse a circular path in the direction of their slant;

(c) transfer means having a pick-up member operable to project into a peripheral portion of said bundle which projects above said container and grasp an individual lead-wire of said contained bundle; and (d) drive means for moving said pick-up member to cause said pick-up member to lift said grasped individual lead-wire from said container and then deliver to said receiving member.

References Cited by the Examiner

UNITED STATES PATENTS

| | | | |
|---|---|---|---|
| 1,958,243 | 5/1934 | Illingworth | 221—210 X |
| 2,053,946 | 9/1936 | Donovan et al. | 221—210 X |
| 2,845,200 | 7/1958 | Dilts et al. | 221—210 |
| 2,896,819 | 7/1959 | Rutz et al. | 221—210 X |
| 3,126,127 | 3/1964 | Lovendusky | 221—210 |

SAMUEL F. COLEMAN, *Primary Examiner.*